United States Patent
Feng et al.

(10) Patent No.: US 10,931,873 B2
(45) Date of Patent: Feb. 23, 2021

(54) METHOD AND SYSTEM FOR PANORAMA STITCHING OF TRAILER IMAGES

(71) Applicants: Erich Jaeger GmbH + Co. KG, Friedberg (DE); Beijing Dachuan Technology Co., LTD, Beijing (CN)

(72) Inventors: Yang Feng, Beijing (CN); Taotao Wang, Beijing (CN); Yabin Zhang, Beijing (CN); Su Yan, Beijing (CN); Zhenheng Shi, Beijing (CN); Yanwei Wei, Beijing (CN)

(73) Assignees: ERICH JAEGER GMBH + CO. KG, Friedberg (DE); BEIJING DACHUAN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/751,481

(22) Filed: Jan. 24, 2020

(65) Prior Publication Data

US 2020/0322531 A1 Oct. 8, 2020

(30) Foreign Application Priority Data

Jan. 24, 2019 (CN) .......................... 201910066196.7

(51) Int. Cl.
*H04N 5/232* (2006.01)
*H04N 19/70* (2014.01)
(Continued)

(52) U.S. Cl.
CPC ....... *H04N 5/23238* (2013.01); *G06T 3/4038* (2013.01); *H04N 5/247* (2013.01); *H04N 19/70* (2014.11); *G06T 2207/20221* (2013.01)

(58) Field of Classification Search
None
See application file for complete search history.

(56) References Cited

U.S. PATENT DOCUMENTS 9,049,396 B2 6/2015 Silverstein et al.
10,674,079 B2 * 6/2020 Pan ...................... H04N 13/111

OTHER PUBLICATIONS

Soderroos, A., "Fisheye Camera Calibration and Image Stitching for Automotive Applications", Department of Electrical Engineering, Linkopings universitet, Sweden, Jan. 2015 (Year: 2015).*

(Continued)

*Primary Examiner* — Lindsay J Uhl
(74) *Attorney, Agent, or Firm* — Leydig, Voit & Mayer, Ltd.

(57) ABSTRACT

The methods and systems for panorama stitching of trailer images provided by the present invention relates to the field of image processing, comprising: receiving, by a first onboard device, a first image data sent by a camera disposed on the left of the carriage, a second image data sent by a camera disposed on the right of the carriage, and a third image data sent by a camera disposed at the back of the carriage in real time; respectively analyzing the first image data, the second image data and the third image data utilizing an opencv algorithm, to obtain intrinsic parameters, extrinsic parameters and distortion parameters of the cameras; respectively acquiring feature points of the seventh image data, the eighth image data and the ninth image data utilizing a scale invariant algorithm to obtain a set of feature points; and stitching the first image data, the second image data and the third image data according to the set of the feature points to generate a first stitched image; utilizing an H.264 algorithm, the invention achieves panorama stitching of trailer images and increases the safety of a driver driving the trailer.

10 Claims, 4 Drawing Sheets

(51) Int. Cl.
    *G06T 3/40*        (2006.01)
    *H04N 5/247*       (2006.01)

(56) References Cited

OTHER PUBLICATIONS

Yebes, J., et al., "Surrounding View for Enhancing Safety on Vehicles", Proceedings of the 2012 IEEE Intelligent Vehicles Symposium Workshops, pp. 1-6, Jan. 2012 (Year: 2012).*
Yebes, J. Javier et al., "Surrounding View for Enhancing Safety on Vehicles," Proceedings of the 2012 IEEE Intelligent Vehicles Symposium Workshops, pp. 1-6, Jan. 2012.
Soderroos, Anna, "Fisheye Camera Calibration and Image Stitching for Automotive Appications," Department of Electrical Engineering, Linkopings universitet, Sweden, Jan. 2015.

* cited by examiner

METHOD AND SYSTEM FOR PANORAMA STITCHING OF TRAILER IMAGES

TECHNICAL FIELD

The present invention relates to the field of image processing technology, more specifically to a method and system for panorama stitching of trailer images.

BACKGROUND ART

A trailer generally comprises two parts: a tractor and a carriage. The 360° panoramic surround-view system currently available on the market requires maintaining relative stationary state among several cameras. During the normal driving and turning of a trailer, the relative location between the tractor and the carriage is momentarily changing. There will be blind zones between the tractor and the carriage. These blind zones are very difficult to be acquired by cameras, thus hinging a lot of inconvenience to the driver, and causing the vehicles and pedestrians traveling along with the trailer in great danger.

SUMMARY

To solve the deficiencies of the prior art, embodiments of the invention provide a method and system for panorama stitching of trailer images.

In a first aspect, an embodiment of the invention provides a method for panorama stitching of trailer images, the method comprising the following steps:

Step 11: receiving a first image data sent by a camera disposed on the left of the carriage, a second image data sent by a camera disposed on the right of the carriage, and a third image data sent by a camera disposed at the back of the carriage in real time;

Step 12: respectively analyzing the first image data, the second image data and the third image data utilizing an opencv algorithm, to obtain intrinsic parameters, extrinsic parameters and distortion parameters of the cameras;

Step 13: respectively correcting the first image data, the second image data and the third image data according to the distortion parameters and a linear interpolation algorithm, to generate a fourth image data, a fifth image data and a sixth image data;

Step 14: establishing a world coordinate system and an image coordinate system according to the intrinsic parameters and the extrinsic parameters, and performing projection transformation on the world coordinate system and the image coordinate system, so as to obtain perspective transformation parameters;

Step 15: respectively performing perspective transformation on the fourth image data, the fifth image data and the sixth image data according to the perspective transformation parameters, to generate a seventh image data, an eighth image data and a ninth image data;

Step 16: respectively acquiring feature points of the seventh image data, the eighth image data and the ninth image data utilizing a scale invariant algorithm to obtain a set of feature points, and stitching the first image data, the second image data and the third image data according to the set of feature points to generate a first stitched image, wherein the first stitched image is a 270° holographic image;

Step 17: after encoding the first stitched image utilizing an H.264 algorithm, sending the first stitched image to a second on-board device disposed at the tractor of the trailer.

Further, the method also comprises:

receiving the carriage motion direction data sent by a first angular velocity sensor disposed within the carriage of the trailer in real time and sending the carriage motion data to a second on-board device disposed at the tractor of the trailer, wherein the carriage motion data comprises motion direction, velocity and location of the carriage, In a second aspect, an embodiment of the invention provides another method for panorama stitching of trailer images, the method comprising the following steps:

Step 21: receiving a tenth image data sent by a camera disposed on the left of the tractor, an eleventh image data sent by a camera disposed on the right of the tractor, and a twelfth image data sent by a camera disposed at the front of the tractor in real time;

Step 22: respectively analyzing the tenth image data, the eleventh image data and the twelfth image data utilizing an opencv algorithm, to obtain intrinsic parameters, extrinsic parameters and distortion parameters of the cameras;

Step 23: respectively correcting the tenth image data, the eleventh image data and the twelfth image data according to the distortion parameters and a linear interpolation algorithm, to generate a thirteenth image data, a fourteenth image data and a fifteenth image data;

Step 24: establishing a world coordinate system and an image coordinate system according to the intrinsic parameters and the extrinsic parameters, and performing projection transformation on the world coordinate system and the image coordinate system so as to obtain perspective transformation parameters;

Step 25: respectively performing perspective transformation on the thirteenth image data, the fourteenth image data and the fifteenth image data according to the perspective transformation parameters, to generate a sixteenth image data, a seventeenth image data and an eighteenth image data Step 26: respectively acquiring feature points of the sixteenth image data, the seventeenth image data and the eighteenth image data utilizing a scale invariant algorithm to obtain a set of feature points, and stitching the sixteenth image data, the seventeenth image data and the eighteenth image data according to the set of feature points to generate a second stitched image, wherein the second stitched image is a 270° holographic image;

Step 27: receiving a first stitched image sent by a first on-board device disposed within the carriage of the trailer and decoding the first stitched image utilizing an H.264 algorithm:

Step 28: stitching and performing fusion for the first stitched image and the second stitched image utilizing an image fusion technology to generate a 360° panorama image;

Step 29: displaying the 360° panorama image utilizing an op tingles texture mapping technology.

Further, the method also comprises:

receiving carriage motion data sent by the first on-board device and tractor motion data sent by a second angular velocity sensor disposed within the tractor of the trailer in real time, wherein the tractor motion data comprises motion direction, velocity and location of the tractor;

calculating an angle between the tractor and the carriage in real time according to the carriage motion direction data and the tractor motion direction data to generate an angular difference data.

Further, the method also comprises:

performing fusion for the angular difference data, the first stitched image and the second stitched image utilizing an image fusion technology to generate a 360° panorama image.

In a third aspect, an embodiment of the invention provides a system for panorama stitching of trailer images, the system comprising:

a first receiving module for receiving a first image data sent by a camera disposed on the left of the carriage, a second image data sent by a camera disposed on the right of the carriage, and a third image data sent by a camera disposed at the back of the carriage in real time;

a first analysis module for respectively analyzing the first image data, the second image data and the third image data utilizing an opencv algorithm, to obtain intrinsic parameters, extrinsic parameters and distortion parameters of the cameras;

a first correction module for respectively correcting the first image data, the second image data and the third image data according to the distortion parameters and a linear interpolation algorithm, to generate a fourth image data, a fifth image data and a sixth image data;

a first establishment module for establishing a world coordinate system and an image coordinate system according to the intrinsic parameters and the extrinsic parameters, and performing projection transformation on the world coordinate system and the image coordinate system, so as to obtain perspective transformation parameters;

a first transformation module for respectively performing perspective transformation on the fourth image data, the fifth image data and the sixth image data according to the perspective transformation parameters, to generate a seventh image data, an eighth image data and a ninth image data;

a first stitch module for respectively acquiring feature points of the seventh image data, the eighth image data and the ninth image data utilizing a scale invariant algorithm to obtain a set of feature points, and stitching the first image data, the second image data and the third image data according to the set of feature points to generate a first stitched image, wherein the first stitched image is a 270° holographic image;

a sending, module for sending, the first stitched image to a second on-board device disposed at the tractor of the trailer after encoding the first stitched image utilizing an H.264 algorithm.

Further, the first receiving module is also for:

receiving carriage motion direction data sent by a first angular velocity sensor disposed within the carriage of the trailer in real time and sending the carriage motion data to a second on-board device disposed at the tractor of the trailer, wherein the carriage motion data comprises motion direction, velocity and location of the carriage.

In a fourth aspect, an embodiment of the invention provides another system for panorama stitching of trailer images, the system comprising:

a second receiving module for receiving a tenth image data sent by a camera disposed on the left of the tractor, an eleventh image data sent by a camera disposed on the right of the tractor, and a twelfth image data sent by a camera disposed at the front of the tractor in real time;

a second analysis module for respectively analyzing the tenth image data, the eleventh image data and the twelfth image data utilizing an opencv algorithm, to obtain intrinsic parameters, extrinsic parameters and distortion parameters of the cameras;

a second correction module for respectively correcting the tenth image data, the eleventh image data and the twelfth image data according to the distortion parameters and a linear interpolation algorithm, to generate a thirteenth image data, a fourteenth image data and a fifteenth image data;

a second establishment module for establishing a world coordinate system and an image coordinate system according to the intrinsic parameters and the extrinsic parameters, and performing projection transformation on the world coordinate system and the image coordinate system, so as to obtain perspective transformation parameters;

a second transformation module for respectively performing perspective transformation on the thirteenth image data, the fourteenth image data and the fifteenth image data according to the perspective transformation parameters, to generate a sixteenth image data, a seventeenth image data and an eighteenth image data;

a second stitch module for respectively acquiring feature points of the sixteenth image data, the seventeenth image data and the eighteenth image data utilizing a scale invariant algorithm to obtain a set of feature points, and stitching the sixteenth image data, the seventeenth image data and the eighteenth image data according to the set of feature points to generate a second stitched image, wherein the second stitched image is a 270° holographic image;

the second receiving module is also used for receiving a first stitched image sent by a first on-board device disposed within the carriage of the trailer and decoding the first stitched image utilizing an H.264 algorithm;

a fusion module for stitching and performing fusion for the first stitched image and the second stitched image utilizing an image fusion technology to generate a 360° panorama image;

a display module for displaying the 360° panorama image utilizing an opengles texture mapping technology.

Further, the second receiving module is also for:

receiving carriage motion data sent by the first on-board device and tractor motion data sent by a second angular velocity sensor disposed within the tractor of the trailer in real time, wherein the tractor motion data comprises motion direction, velocity and location of the tractor;

calculating an angle between the tractor and the carriage in real time according to the carriage motion direction data and the tractor motion direction data to generate an angular difference data.

Further, the fusion module is also for;

performing fusion for the angular difference data, the first stitched image and the second stitched image utilizing an image fusion technology to generate a 360° panorama image.

The methods and systems for panorama stitching of trailer images provided by embodiments of the invention have the following beneficial effects:

it solves the problem that the blind zones between the tractor and the carriage cannot be acquired by the cameras during the normal driving and turning of a trailer, achieves panorama stitching of the trailer images and increases safety of a driver driving the trailer.

DETAILED DESCRIPTION

The present invention will be specifically introduced below with reference to the accompanying figures and specific embodiments.

Figure 1:
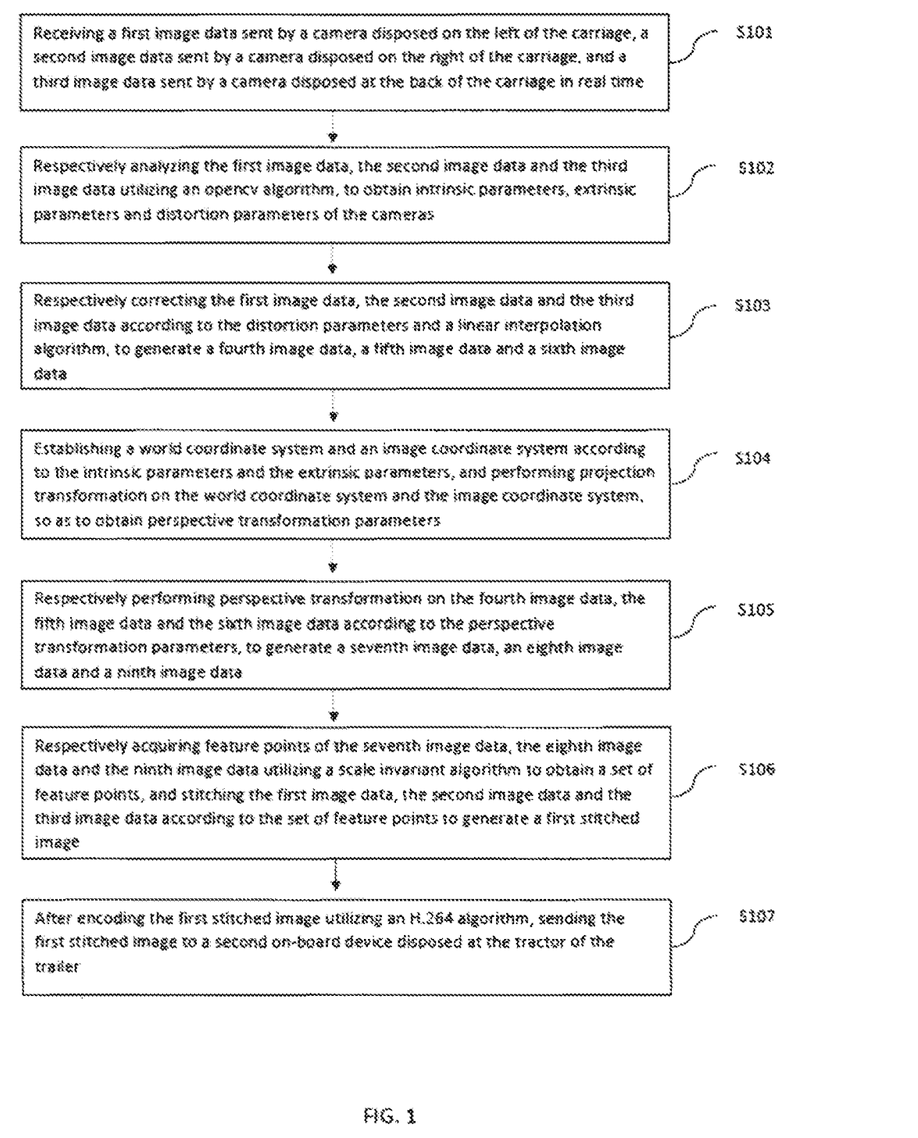
FIG. 1 is a schematic flowchart of a panorama stitching method for trailer images provided by embodiments of the invention.

With reference to FIG. 1, a panorama stitching method for trailer images provided by embodiments of the invention comprises the following steps:

S101: receiving a first image data sent by a camera disposed on the left of the carriage, a second image data sent by a camera disposed on the right of the carriage, and a third image data sent by a camera disposed at the hack of the carriage in real time.

As a specific embodiment, each of the first image data, the second image data and the third image data is an image of 1280×720 size.

S102: respectively analyzing the first image data, the second image data and the third image data utilizing an opencv algorithm, to obtain intrinsic parameters, extrinsic parameters and distortion parameters of the cameras.

S103: respectively correcting the first image data, the second image data and the third image data according to the distortion parameters and a linear interpolation algorithm, to generate a fourth image data, a fifth image data and a sixth image data.

S104: establishing a world coordinate system and an image coordinate system according to the intrinsic parameters and the extrinsic parameters, and performing projection transformation on the world coordinate system and the image coordinate system, so as to obtain perspective transformation parameters.

S105: respectively performing perspective transformation on the fourth image data, the fifth image data and the sixth image data according to the perspective transformation parameters, to generate a seventh image data, an eighth image data and a ninth image data.

S106: respectively acquiring feature points of the seventh image data, the eighth image data and the ninth image data utilizing a scale invariant algorithm to obtain a set of feature points, and stitching the first image data, the second image data and the third image data according to the set of feature points to generate a first stitched image, wherein the first stitched image is a 270° holographic image.

As a specific embodiment, three images of 1280×720 size are stitched into one 270° holographic image of 1280×720 size.

S107: after encoding the first stitched image utilizing an H.264 algorithm, sending the first stitched image to a second on-board device disposed at the tractor of the trailer.

As a specific embodiment, encoding the first stitched image reduces the space occupied by the first stitched image, thus facilitating the subsequent transmission of the first stitched image.

Optionally, the method also comprises:

receiving carriage motion direction data sent by a first angular velocity sensor disposed within the carriage of the trailer in real time and sending the carriage motion data to a second on-board device disposed at the tractor of the trailer, wherein the carriage motion data comprises motion direction, velocity and location of the carriage.

Figure 2:
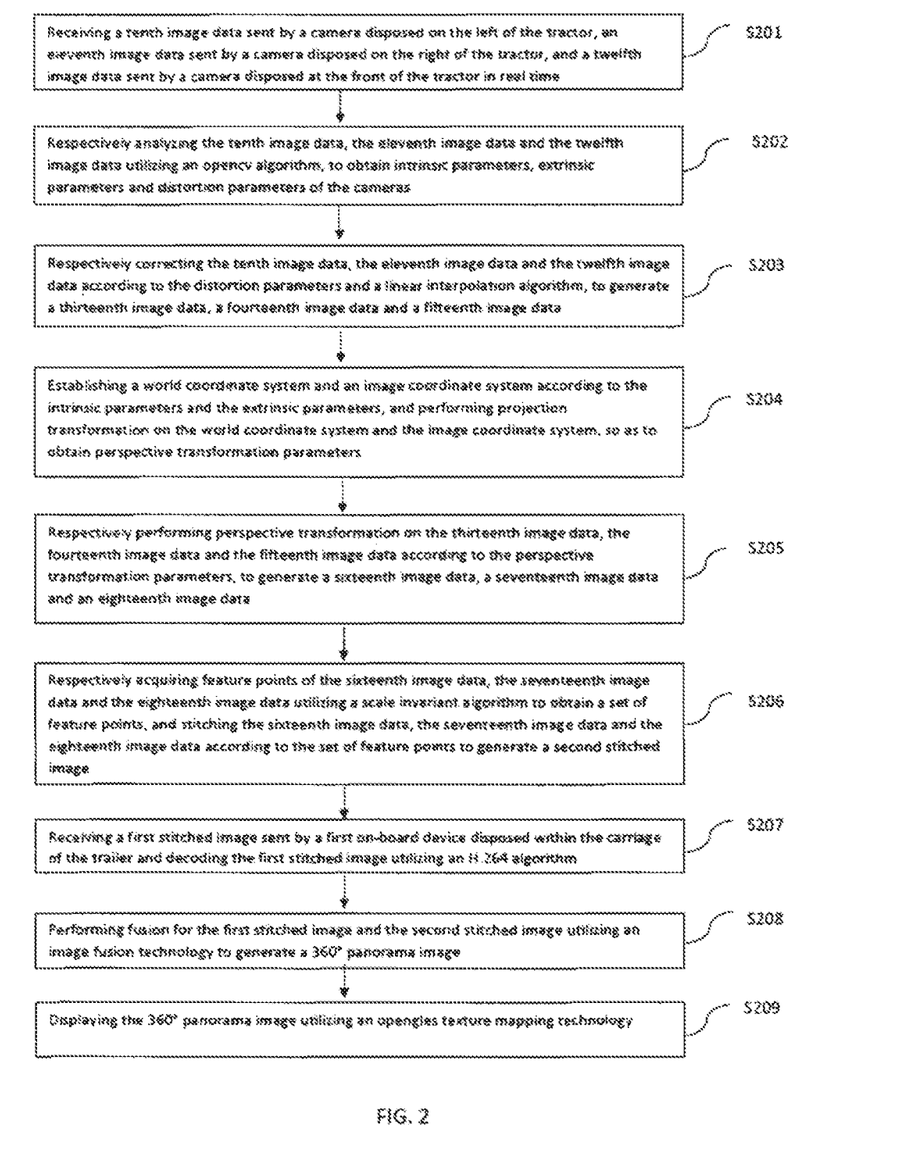
FIG. 2 is a schematic flowchart of another panorama stitching method for trailer images provided by embodiments of the invention.

With reference to FIG. 2, another method for panorama stitching of trailer images provided by embodiments of the invention comprises the following steps:

S201: receiving a tenth image data sent by a camera disposed on the left of the tractor, an eleventh image data sent by a camera disposed on the right of the tractor, and a twelfth image data sent by a camera disposed at the front of the tractor in real time.

S202: respectively analyzing the tenth image data, the eleventh image data and the twelfth image data utilizing an opencv algorithm, to obtain intrinsic parameters, extrinsic parameters and distortion parameters of the cameras.

S203: respectively correcting the tenth image data, the eleventh image data and the twelfth image data according to the distortion parameters and a linear interpolation algorithm, to generate a thirteenth image data, a fourteenth image data and a fifteenth image data.

S204: establishing a world coordinate system and an image coordinate system according to the intrinsic parameters and the extrinsic parameters, and performing projection transformation on thy world coordinate system and the image coordinate system, so as to obtain perspective transformation parameters.

S205: respectively performing perspective transformation on the thirteenth image data, the fourteenth image data and the fifteenth image data according to the perspective transformation parameters, to generate a sixteenth image data, a seventeenth image data and an eighteenth image data.

S206: respectively acquiring feature points of the sixteenth image data, the seventeenth image data and the eighteenth image data utilizing a scale invariant algorithm to obtain a set of feature points, and stitching the sixteenth image data, the seventeenth image data and the eighteenth image data according to the set of feature points to generate a second stitched image, wherein the second stitched image is a 270° holographic image.

S207: receiving a first stitched image sent by a first on-board device disposed within the carriage of thy trailer and decoding the first stitched image utilizing an H.264 algorithm.

S208: performing fusion for the first stitched image and the second stitched image utilizing an image fusion technology to generate a 360° panorama image.

In particular, there is a noticeable gap at the stitches of the stitched image, and it is necessary to perform fusion processing to the images at both sides of the gap by an algorithm to eliminate the gap.

S209: displaying the 360° panorama image utilizing an opengles texture mapping technology.

Optionally, the method also comprises:

receiving carriage motion data sent by the first on-board device and tractor motion data sent by a second angular velocity sensor disposed within the tractor of the trailer in real time, wherein the tractor motion data comprises motion direction, velocity and location of the tractor;

calculating an angle between the tractor and the carriage in real time according to the carriage motion direction data and the tractor motion direction data to generate an angular difference data.

Optionally, the method also comprises:

performing fusion for the angular difference data, the first stitched image and the second stitched image utilizing an image fusion technology to generate a 360° panorama image.

As a specific embodiment, a value of the relative angle between the tractor and the carriage is acquired by a gyroscope in real time. In the end, the real-time images of the front and rear vehicles are presented on a screen. And the real-time angular difference between the tractor and the carriage can be exhibited on the images. When the vehicle is turning left or turning right, the driver can intuitively see the turnings of the tractor and the carriage of the trailer on the images.

Figure 3:
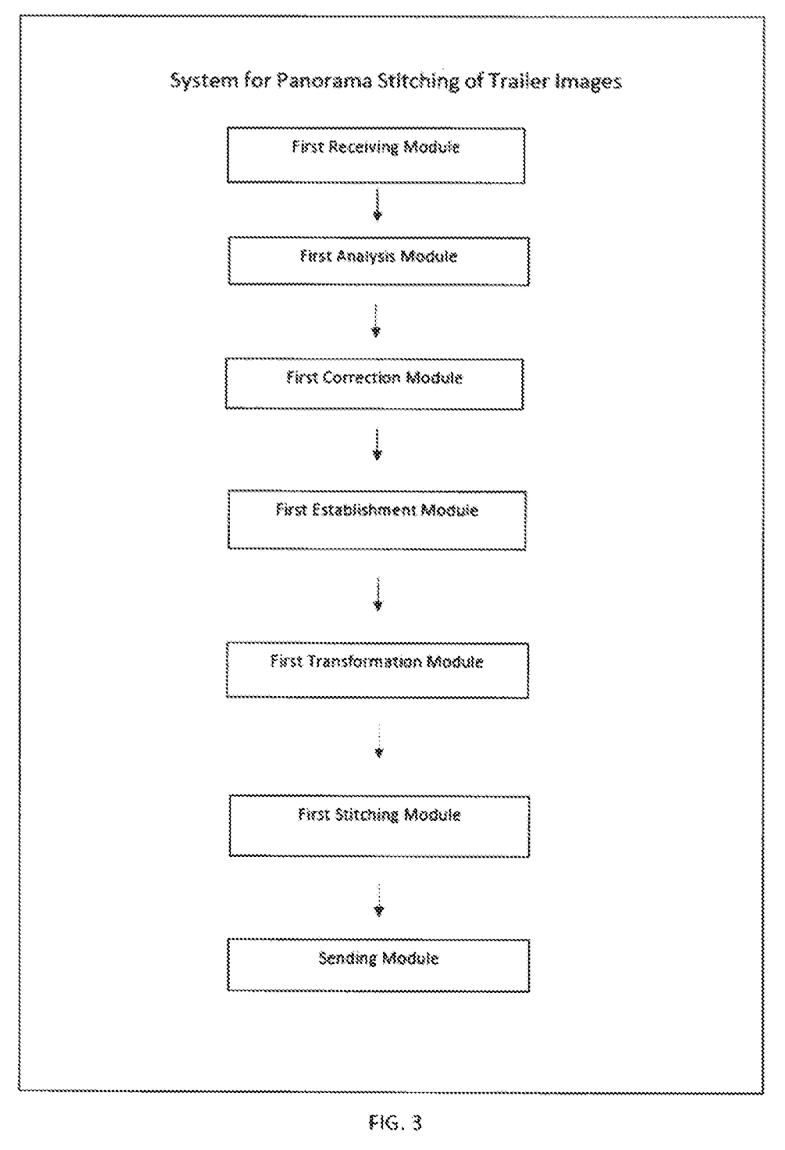
FIG. 3 is a schematic structure diagram of a panorama stitching system for trailer images provided by embodiments of the invention.

With reference to FIG. 3, a system for panorama stitching of trailer images provided by embodiments of the invention comprises:

a first receiving module for receiving a first image data sent by a camera disposed on the left of the carriage, a second image data sent by a camera disposed on the right of the carriage, and a third image data sent by a camera disposed at the back of the carriage in real time;

a first analysis module for respectively analyzing the first image data, the second image data and the third image data utilizing an opencv algorithm, to obtain intrinsic parameters, extrinsic parameters and distortion parameters of the cameras;

a first correction module for respectively correcting the first image data, the second image data and the third image data according to the distortion parameters and a linear interpolation algorithm, to generate a fourth image data, a fifth image data and a sixth image data;

a first establishment module for establishing a world coordinating system and an image coordinate system according to the intrinsic parameters and the extrinsic parameters, and performing projection transformation on the world coordinate system and the image coordinate system, so as to obtain perspective transformation parameters;

a first transformation module for respectively performing perspective transformation on the fourth image data, the fifth image data and the sixth image data according to the perspective transformation parameters, to generate a seventh image data, an eighth image data and a ninth image data;

a first stitch module for respectively acquiring feature points of the seventh image data, the eighth image data and the ninth image data utilizing a scale invariant algorithm to obtain a set of feature points, and stitching the first image data, the second image data and the third image data according to the set of feature points to generate a first stitched image, wherein the first stitched image is a 270° holographic image;

a sending module for sending the first stitched image to a second on-board device disposed at the tractor of the trailer after encoding the first stitched image utilizing an H.264 algorithm.

Further, the first receiving module is also for:

receiving carriage motion direction data sent by a first angular velocity sensor disposed within the carriage of the trailer in real time and sending the carriage motion data to a second on-board device disposed at the tractor of the trailer, wherein the carriage motion data comprises motion direction, velocity and location of the carriage.

Figure 4:
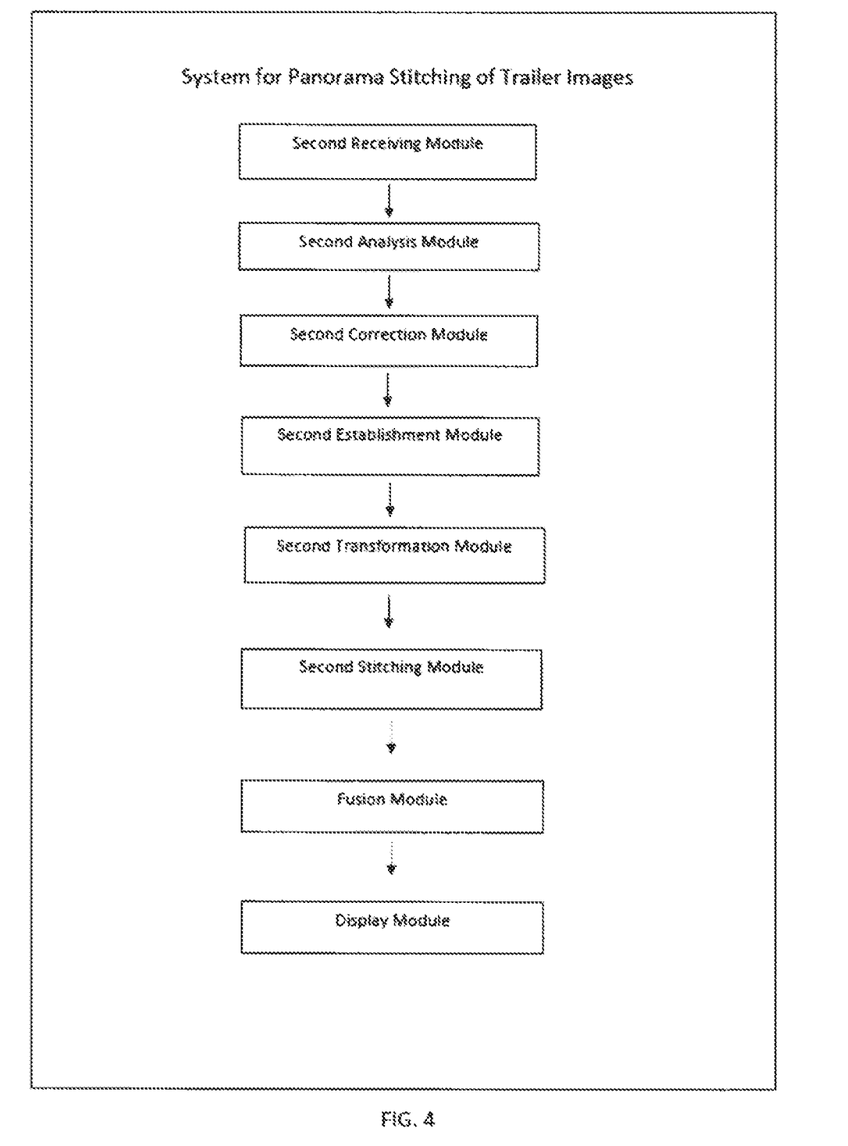
FIG. 4 is a schematic structure diagram of another panorama stitching system for trailer images provided by embodiments of the invention.

With reference to FIG. 4, another system for panorama stitching of trailer images provided by embodiments of the invention comprises:

a second receiving module for receiving a tenth image data sent by a camera disposed on the left of the tractor, an eleventh image data sent by a camera disposed on the right of the tractor, and a twelfth image data sent by a camera disposed at the front of the tractor in real time;

a second analysis module for respectively analyzing the tenth image data, the eleventh image data and the twelfth image data utilizing an opencv algorithm, to obtain intrinsic parameters, extrinsic parameters and distortion parameters of the cameras;

a second correction module for respectively correcting the tenth image data, the eleventh image data and the twelfth image data according to the distortion parameters and a linear interpolation algorithm, to generate a thirteenth image data, a fourteenth image data and a fifteenth image data;

a second establishment module for establishing a world coordinate system and an image coordinate system according to the intrinsic parameters and the extrinsic parameters, and performing projection transformation on the world coordinate system and the image coordinate system, so as to obtain perspective transformation parameters;

a second transformation module for respectively performing perspective transformation on the thirteenth image data, the fourteenth image data and the fifteenth image data according to the perspective transformation parameters, to generate a sixteenth image data, a seventeenth image data and an eighteenth image data;

a second stitch module for respectively acquiring feature points of the sixteenth image data, the seventeenth image data and the eighteenth image data utilizing a scale invariant algorithm to obtain a set of feature points, and stitching the sixteenth image data, the seventeenth image data and the eighteenth image data according to the set of feature points to generate a second stitched image, wherein the second stitched image is a 270° holographic image;

the second receiving module is also for receiving a first stitched image sent by a first on-board device disposed within the carriage of the trailer and decoding the first stitched image utilizing an H.264 algorithm;

a fusion module for stitching and performing fusion for the first stitched image and the second stitched image utilizing an image fusion technology to generate a 360° panorama image:

a display module for displaying the 360° panorama image utilizing an opengles texture mapping technology.

Further, the second receiving module is also for:

receiving carriage motion data sent by the first on-board device and tractor motion data sent by a second angular velocity sensor disposed within the tractor of the trailer in real time, wherein the tractor motion data comprises motion direction, velocity and location of the tractor;

calculating an angle between the tractor and the carriage in real time according to the carriage motion direction data and the tractor motion direction data to generate an angular difference data.

Further, the fusion module is also for:

performing fusion for the angular difference data, the first stitched image and the second stitched image utilizing an image fusion technology to generate a 360° panorama image.

The methods and systems for panorama stitching of trailer images provided by embodiments of the invention solve the problem that the blind zones between the tractor and the carriage cannot be acquired by the cameras during the normal driving and turning of the trailer, and achieve panorama stitching of trailer images and increase safety of a driver driving the trailer by the following steps: receiving, by a first on-board device, a first image data sent by a camera disposed on the left of the carriage, a second image data sent by a camera disposed on the right of the carriage, and a third image data sent by a camera disposed at the back of the carriage in real time; respectively analyzing the first image data, the second image data and the third image data utilizing an opencv algorithm, to obtain intrinsic parameters, extrinsic parameters and distortion parameters of the cameras; respectively correcting the first image data, the second image data and the third image data according to the distortion parameters and a linear interpolation algorithm, to generate a fourth image data, a fifth image data and a sixth image data; establishing a world coordinate system and an image coordinate system according to the intrinsic parameters and the extrinsic parameters, and performing projection transformation on the world coordinate system and the image coordinate system, so as to obtain perspective transformation parameters; respectively performing perspective transformation on the fourth image data, the fifth image data and the sixth image data according to the perspective transformation parameters, to generate a seventh image data, an eighth image data and a ninth image data; respectively acquiring feature points of the seventh image data, the eighth image data and the ninth image data utilizing a scale invariant algorithm to obtain a set of feature points; stitching the first image data, the second image data and the third image data according to the set of feature points to generate a first stitched image; sending the first stitched image to a second on-board device disposed at the tractor of the trailer after encoding the first stitched image utilizing an H.264 algorithm; receiving, by a second on-board device, a tenth image data sent by a camera disposed on the left of the tractor, an eleventh image data sent by a camera disposed on the right of the tractor, and a twelfth image data sent by a camera disposed at the front of the tractor in real time; respectively analyzing the tenth image data, the eleventh image data and the twelfth image data utilizing an opencv algorithm, to obtain intrinsic parameters, extrinsic parameters and distortion parameters of the cameras; respectively correcting the tenth image data, the eleventh image data and the twelfth image data according to the distortion parameters and a linear interpolation algorithm, to generate a thirteenth image data, a fourteenth image data and a fifteenth image data; establishing a world coordinate system and an image coordinate system according to the intrinsic parameters and the extrinsic parameters, and performing projection transformation on the world coordinate system and the image coordinate system, so as to obtain perspective transformation parameters; respectively performing perspective transformation on the thirteenth image data, the fourteenth image data and the fifteenth image data according to the perspective transformation parameter, to generate a sixteenth image data, a seventeenth image data and an eighteenth image data; respectively acquiring feature points of the sixteenth image data, the seventeenth image data and the eighteenth image data utilizing a scale invariant algorithm to obtain a set of feature points, and stitching the sixteenth image data, the seventeenth image data and the eighteenth image data according to the set of feature points to generate a second stitched image, wherein the second stitched image is a 270° holographic image; receiving a first stitched image sent by a first on-board device disposed within the carriage of the trailer and decoding the first stitched image utilizing an H.264 algorithm; performing fusion for the first stitched image and the second stitched image utilizing an image fusion technology to generate a 360° panorama image; displaying the 360° panorama image utilizing an opengles texture mapping technology.

In the above embodiments, the descriptions of the various embodiments have different emphases, and the portions that are not detailed in a certain embodiment may refer to the related descriptions of other embodiments.

It can be understood that the related features in the above methods and apparatuses may be referred to each other. In addition, "first", "second", and the like in the above embodiments are used to distinguish the various embodiments from each other, and do not represent advantages and/or disadvantages of the various embodiments.

Those skilled in the art can clearly understand that, for the convenience and brevity of the description, the specific working process of the systems, apparatuses and units described above may refer to the corresponding process in the foregoing method embodiments, and will not be described any further.

The algorithms and displays provided herein are not inherently related to any particular computer, virtual system, or other device. Various general purpose systems can also be used with the teachings based on the invention. The structure required to construct such a system is apparent from the above description. Moreover, the present invention is not directed to any particular programming language. It is to be understood that the disclosure of the invention described herein may be implemented with a variety of programming languages, and the above description of the specific language is described to disclose the best implementation of the invention.

Furthermore, the memory may include the form of non-persistent memory, random access memory (RAM) and/or non-volatile memory and the like in a computer-readable medium, such as read only memory (ROM) or flash memory (flash RAM). The memory includes at least one memory chip.

Those skilled in the art will appreciate that embodiments of the present application I 5 may be provided as a method, system, or computer program product. Thus, the present application can take the form of an entirely hardware embodiment, an entirely software embodiment, or an embodiment combining software and hardware aspects. Moreover, the present application can take the form of a computer program product embodied on one or more computer-usable storage medium (including but not limited to magnetic disk memory, CD-ROM, optical memory, and the like) containing computer-usable program code.

The present application is described with reference to flowcharts and/or block diagrams of methods, devices systems), and computer program products according to embodiments of the present application. It is to be understood that each flow and/or block in the flowcharts and/or block diagrams as well as combinations of flows and/or blocks in the flowcharts and/or block diagrams can be implemented by computer program instructions. These computer program instructions can be provided to a processor of a general purpose computer, special purpose computer, embedded processor, or other programmable data processing device to produce a machine, such that the instructions executed by a processor of a computer or other programmable data processing device produce means for implementing the functions specified in one or more flows in the flowcharts and/or one or more blocks in the block diagrams.

These computer program instructions may also be stored in a computer-readable memory that can direct a computer or other programmable data processing device to operate in a particular manner, such that the instructions stored in this computer-readable memory produce an article of manufacture comprising instructing means. The instructing means implements the functions specified in one or more flows in the flowcharts and/or one or more blocks in the block diagrams.

These computer program instructions may also be loaded onto a computer or other programmable data processing device, such that a series of operational steps are performed on the computer or other programmable device to produce computer-implemented processing. Thereby the instructions executed on a computer or other programmable device provide steps for implementing the functions specified in one or more flows in the flowcharts and/or one or more blocks in the block diagrams.

In a typical configuration, a computing device includes one or more processors (CPUs), input/output interfaces, network interfaces, and memory.

The memory may include the form of non-persistent memory, random access memory (RAM), and/or non-volatile memory in a computer-readable medium, such as read only memory (ROM) or flash memory (flash RAM). The memory is an example of a computer-readable medium.

Computer-readable medium includes both permanent and non-permanent, removable and non-removable media. Information storage can be implemented by any method or technology. The information can be computer-readable instructions, data structures, modules of programs, or other data. Examples of computer storage medium includes, but is not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, read only optical disk read only memory (CD-ROM), digital versatile disk (DVD) or other optical storage, cassette tape, tape, magnetic disk storage or other magnetic storage devices or any other non-transmission medium which may be used to store information that can be accessed by a computing device. According to the definition herein, computer-readable medium does not include transitory computer readable media(transitory media), such as modulated data signals and carriers.

It is also to be stated that the terms "comprise", "include" or any other variations are intended to encompass a non-exclusive inclusion, such that a process, method, commodity, or device comprising a series of elements not only comprises those elements, but also comprises other elements not explicitly listed, or also comprises elements that are inherent to such a process, method, commodity, or device. Without further limitation, an element defined by the phrase "comprising a . . . " does not exclude the presence of additional same elements in a process, method, commodity, or device that comprises the element.

Those skilled in the art will appreciate that embodiments of the present application may be provided as a method, system, or computer program product. Thus, the present application can take the form of an entirely hardware embodiment, an entirely software embodiment or an embodiment combining the software and hardware aspects. Moreover, the present application can take the form of a computer program product embodied on one or more computer-usable storage medium (including but not limited to magnetic disk memory, CD-ROM, optical memory, and the like) containing computer-usable program code.

The above disclosure is only embodiments of the present application and is not to limit the present application. For those skilled in the art, various modifications and changes can be made to the present application. Any modifications, equivalent substitutions, improvements and the like made within the spirit and principle of the present application shall all be included within the scope of the appended claims.

The invention claimed is:

1. A method for panorama stitching of trailer images suitable for a first on-board device disposed within a carriage of a trailer comprises:

receiving a first image data sent by a camera disposed on the left of the carriage, a second image data sent by a camera disposed on the right of the carriage, and a third image data sent by a camera disposed at the back of the carriage in real time;

respectively analyzing the first image data, the second image data and the third image data utilizing an openCV algorithm, to obtain intrinsic parameters, extrinsic parameters and distortion parameters of the cameras;

respectively correcting the first image data, the second image data and the third image data according to the distortion parameters and a linear interpolation algorithm, to generate a fourth image data, a fifth image data and a sixth image data;

establishing a world coordinate system and an image coordinate system according to the intrinsic parameters and the extrinsic parameters, performing projection transformation on the world coordinate system and the image coordinate system, to obtain perspective transformation parameters;

respectively performing perspective transformation on the fourth image data, the fifth image data and the sixth image data according to the perspective transformation parameters, to generate a seventh image data, an eighth image data and a ninth image data;

respectively acquiring feature points of the seventh image data, the eighth image data and the ninth image data utilizing a scale invariant algorithm to obtain a set of feature points, and stitching the first image data, the second image data and the third image data according to the set of feature points to generate a first stitched image, wherein the first stitched image is a 270° holographic image;

after encoding the first stitched image utilizing an H.264 algorithm, sending the first stitched image to a second on-board device disposed at the tractor of the trailer.

2. The method for panorama stitching according to claim 1; also comprising:

receiving carriage motion direction data sent by a first angular velocity sensor disposed within the carriage of the trailer in real time and sending the carriage motion data to a second on-board device disposed at the tractor of the trailer, wherein the carriage motion data comprises motion direction, velocity and location of the carriage.

3. A method for panorama stitching of trailer images suitable for a second on-board device disposed at a tractor of a trailer comprising:

receiving a tenth image data sent by a camera disposed on the left of the tractor, an eleventh image data sent by a camera disposed on the right of the tractor, and a twelfth image data sent by a camera disposed at the front of the tractor in real time;

respectively analyzing the tenth image data, the eleventh image data and the twelfth image data utilizing an openCV algorithm, to obtain intrinsic parameters, extrinsic parameters and distortion parameters of the cameras;

respectively correcting the tenth image data, the eleventh image data, and the twelfth image data according to the distortion parameters and a linear interpolation algorithm, to generate a thirteenth image data, a fourteenth image data, and a fifteenth image data;

establishing a world coordinate system and an image coordinate system according to the intrinsic parameters and the extrinsic parameters, performing projection transformation on the world coordinate system and the image coordinate system, to obtain perspective transformation parameters;

respectively performing perspective transformation on the thirteenth image data, the fourteenth image data and the fifteenth image data according to the perspective transformation parameters, to generate a sixteenth image data, a seventeenth image data, and an eighteenth image data;

respectively acquiring feature points of the sixteenth image data, the seventeenth image data and the eighteenth image data utilizing a scale invariant algorithm to obtain a set of feature points, stitching the sixteenth image data, the seventeenth image data and the eighteenth image data according to the set of feature points to generate a second stitched image, wherein the second stitched image is a 270° holographic image;

receiving a first stitched image sent by a first on-board device disposed within the carriage of the trailer and decoding the first stitched image utilizing an H.264 algorithm;

performing fusion for the first stitched image and the second stitched image utilizing an image fusion technology to generate a 360° panorama image; and displaying the 360° panorama image utilizing an openGL ES texture mapping technology.

4. The method for panorama stitching according to claim 3 also comprising:

receiving carriage motion data sent by the first on-board device and tractor motion data sent by a second angular velocity sensor disposed within the tractor of the trailer in real time, wherein the tractor motion data comprises motion direction, velocity and location of the tractor; and calculating an angle between the tractor and the carriage in real time according to the carriage motion direction data and the tractor motion direction data to generate an angular difference data.

5. The method for panorama stitching according to claim 4 also comprising:

stitching and performing fusion for the angular difference data, the first stitched image and the second stitched image utilizing an image fusion technology to generate a 360° panorama image.

6. A system for panorama stitching of trailer images suitable for a first on-board device disposed within a carriage of a trailer comprising:

a first receiving module for receiving a first image data sent by a camera disposed on the left of the carriage, a second image data sent by a camera disposed on the right of the carriage, and a third image data sent by a camera disposed at the back of the carriage in real time;

a first analysis module for respectively analyzing the first image data, the second image data and the third image data utilizing an opencv algorithm, to obtain intrinsic parameters, extrinsic parameters and distortion parameters of the cameras;

a first correction module for respectively correcting the first image data, the second image data and the third image data according to the distortion parameters and a linear interpolation algorithm, to generate a fourth image data, a fifth image data and a sixth image data;

a first establishment module for establishing a world coordinate system and an image coordinate system according to the intrinsic parameters and the extrinsic parameters, performing projection transformation on the world coordinate system and the image coordinate system to obtain perspective transformation parameters;

a first transformation module for respectively performing perspective transformation on the fourth image data, the fifth image data and the sixth image data according to the perspective transformation parameters, to generate a seventh image data, an eighth image data and a ninth image data;

a first stitch module for respectively acquiring feature points of the seventh image data, the eighth image data and the ninth image data utilizing a scale invariant algorithm to obtain a set of feature points, and stitching the first image data, the second image data and the third image data according to the set of feature points to generate a first stitched image, wherein the first stitched image is a 270° holographic image; and a sending module for sending the first stitched image to a second on-board device disposed at a tractor of the trailer after encoding the first stitched image utilizing an H.264 algorithm.

7. The system for panorama stitching according to claim 6, wherein the first receiving module is also for:

receiving carriage motion direction data sent by a first angular velocity sensor disposed within the carriage of the trailer in real time and sending the carriage motion data to a second on-board device disposed at the tractor of the trailer, wherein the carriage motion data comprises motion direction, velocity and location of the carriage.

8. A system for panorama stitching of trailer images suitable for a second on-board device disposed at a tractor of a trailer comprising:

a second receiving module for receiving a tenth image data sent by a camera disposed on the left of the tractor, an eleventh image data sent by a camera disposed on the right of the tractor, and a twelfth image data sent by a camera disposed at the front of the tractor in real time;

a second analysis module for respectively analyzing the tenth image data, the eleventh image data and the twelfth image data utilizing an openCV algorithm, to obtain intrinsic parameters, extrinsic parameters and distortion parameters of the cameras;

a second correction module for respectively correcting the tenth image data, the eleventh image data and the twelfth image data according to the distortion parameters and a linear interpolation algorithm, to generate a thirteenth image data, a fourteenth image data and a fifteenth image data;

a second establishment module for establishing a world coordinate system and an image coordinate system according to the intrinsic parameters and the extrinsic parameters, performing projection transformation on the world coordinate system and the image coordinate system to obtain perspective transformation parameters;

a second transformation module for respectively performing perspective transformation on the thirteenth image data, the fourteenth image data and the fifteenth image data according to the perspective transformation parameters, to generate a sixteenth image data, a seventeenth image data and an eighteenth image data;

a second stitch module for respectively acquiring feature points of the sixteenth image data, the seventeenth image data and the eighteenth image data utilizing a scale invariant algorithm to obtain a set of feature points, stitching the sixteenth image data, the seventeenth image data and the eighteenth image data according to the set of feature points to generate a second stitched image, wherein the second stitched image is a 270° holographic image;

the second receiving module is also for receiving a first stitched image sent by a first on-board device disposed within the carriage of the trailer and decoding the first stitched image utilizing an H.264 algorithm;

a fusion module for stitching and performing fusion for the first stitched image and the second stitched image utilizing an image fusion technology to generate a 360° panorama image; and a display module for displaying the 360° panorama image utilizing an openGL ES texture mapping technology.

9. The system for panorama stitching according to claim 8, wherein the second receiving module is also for:

receiving carriage motion data sent by the first on-board device and tractor motion data sent by a second angular velocity sensor disposed within the tractor of the trailer in real time, wherein the tractor motion data comprises motion direction, velocity and location of the tractor; and calculating an angle between the tractor and the carriage in real time according to the carriage motion direction data and the tractor motion direction data to generate an angular difference data.

10. The system for panorama stitching according to claim 9, wherein the fusion module is also for:

performing fusion for the angular difference data, the first stitched image and the second stitched image utilizing an image fusion technology to generate a 360° panorama image.

\* \* \* \* \*